United States Patent [19]

Diaz

[11] Patent Number: 5,011,249

[45] Date of Patent: Apr. 30, 1991

[54] CIRCUIT FOR THE TRANSMISSION OF OPTICAL SIGNALS

[75] Inventor: Stephen H. Diaz, Palo Alto, Calif.

[73] Assignee: Raychem Corp., Menlo Park, Calif.

[21] Appl. No.: 454,099

[22] Filed: Dec. 20, 1989

[51] Int. Cl.⁵ .................................... G02B 6/12
[52] U.S. Cl. .................................... 350/96.11; 350/96.15
[58] Field of Search ............ 350/96.10, 96.11, 96.12, 350/96.13, 96.14, 96.15, 96.16, 96.17, 96.18, 96.19, 96.20

[56] References Cited

U.S. PATENT DOCUMENTS

| | | | |
|---|---|---|---|
| 3,993,400 | 11/1976 | Leib | 350/96.15 |
| 4,450,461 | 5/1984 | Cook et al. | 350/96.15 X |
| 4,637,684 | 1/1987 | Tomita et al. | 350/96.19 |

Primary Examiner—John D. Lee
Attorney, Agent, or Firm—Dennis E. Kovach; Herbert G. Burkard

[57] ABSTRACT

A circuit for the transmission of optical signals, which comprises (a) a substrate which includes a waveguide through which an optical signal can pass when the system is in use; (b) an optically active device which is optically connected to the waveguide, the waveguide and the device being separated by a fluid which is transparent to the optical signal; and (c) means by which the substrate and the device are mechanically interconnected, the interconnection means allowing the substrate and the device to move relative to one another, at least in the plane which extends perpendicular to the direction in which the signal passes between the substrate and the device. Preferably, the component and the device are positioned face to face, and are interconnected by interconnection wires which extend between them.

21 Claims, 3 Drawing Sheets

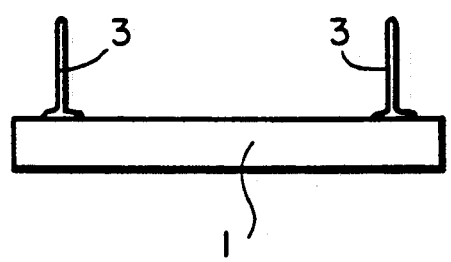
FIG_1
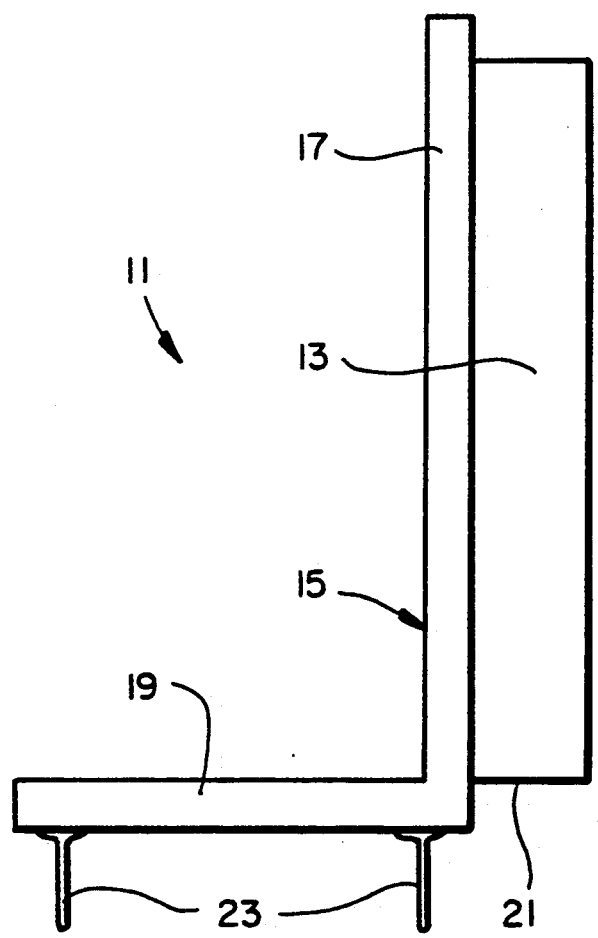
FIG_2

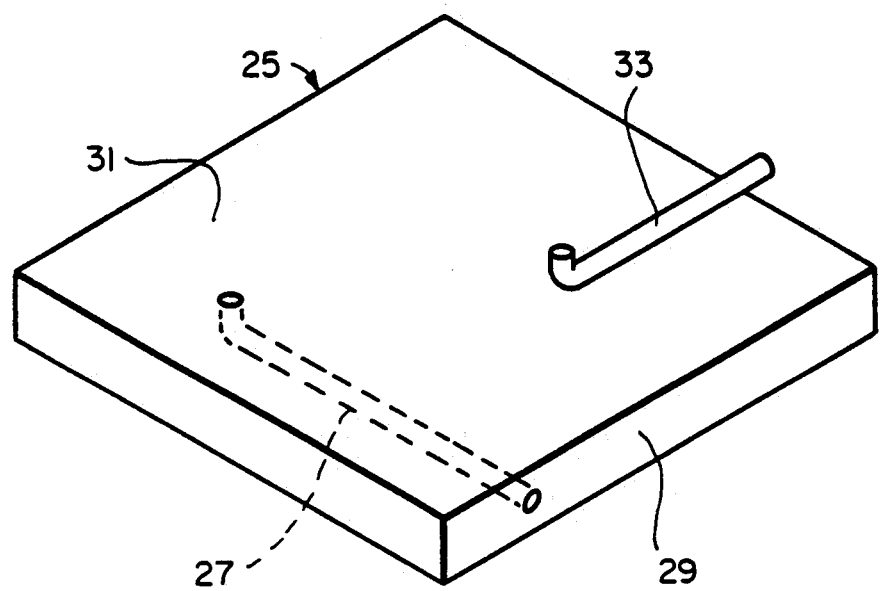
FIG_3
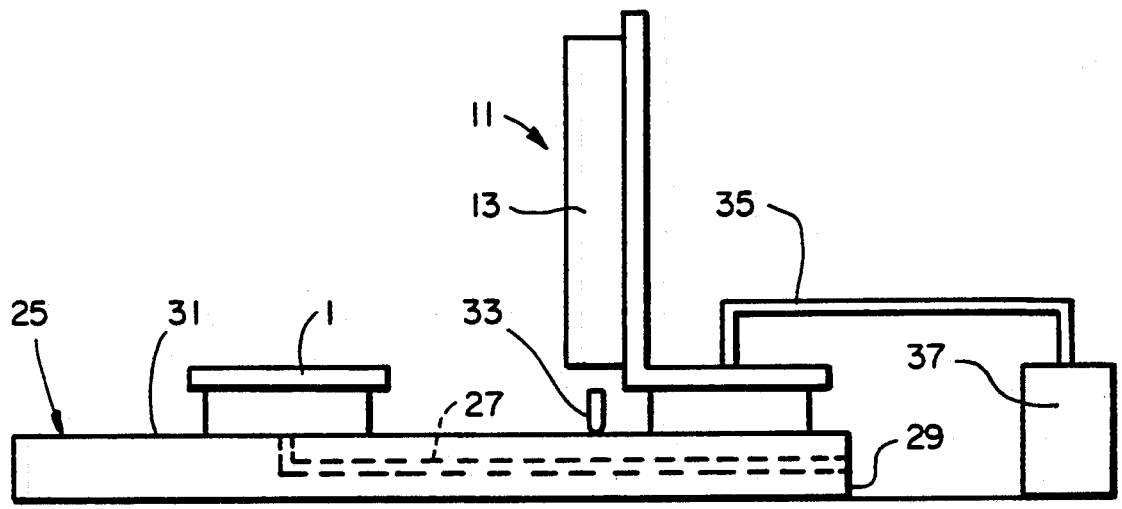
FIG_4

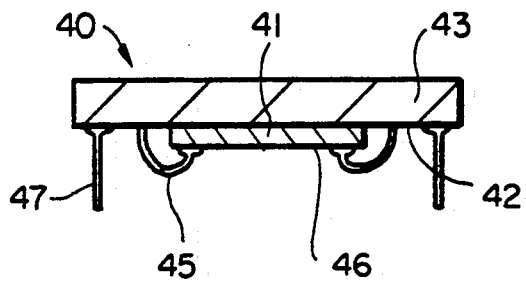
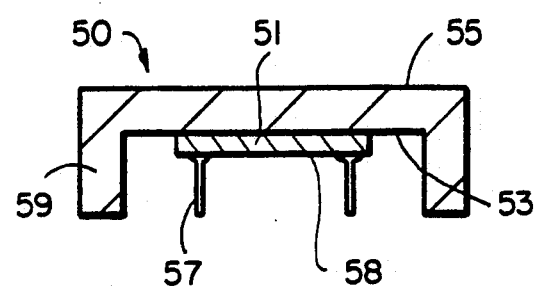
FIG_5          FIG_6
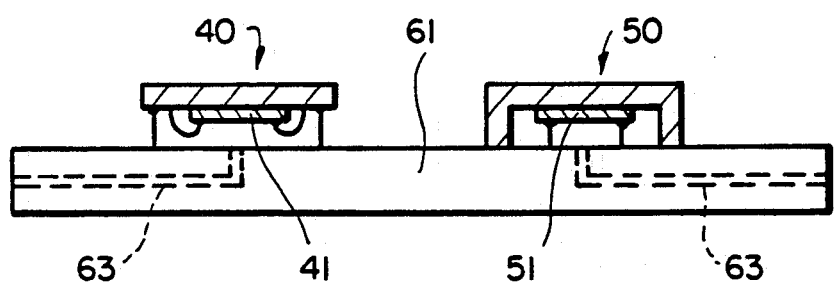
FIG_7
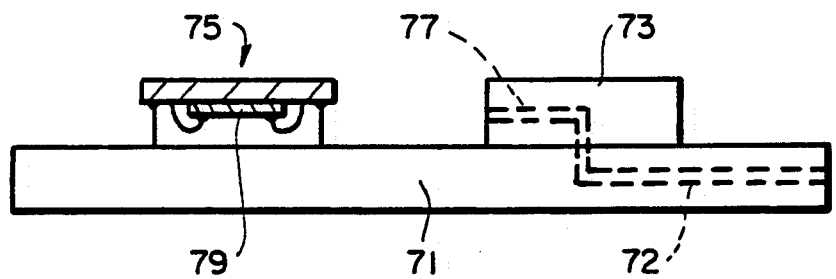
FIG_8

CIRCUIT FOR THE TRANSMISSION OF OPTICAL SIGNALS

This invention relates to a circuit for the transmission of optical signals and to a method of making such a circuit.

The subject matter disclosed in any document which is referred to below is incorporated in this specification by the reference to the document.

Techniques which have been developed for the transmission of electrical signals in high density electronic packages permit fast signal transmission over short distances. Significant advances have been made recently in the transmission of signals by exploiting the properties of optical signals, and by using techniques which have been developed in connection with the transmission of electrical signals. The transmission of optical signals rather than electrical signals has the advantages that information can be transferred significantly faster and more accurately than is the case with electrical signals. Furthermore, problems of cross-talk, which arise between conductors of electrical signals, do not arise between conductors of optical signals.

Optical signals may be transmitted between pieces of equipment by means of optical fibers. The ends of such a fiber must be connected to the equipment or to components thereof in such a way that the signals can be transmitted into or received from the fiber. Frequently, signals which are processed in the equipment are electrical signals rather than optical signals. The interface between the electrical signals and the optical signals may be at the interface between the fiber and the equipment. More preferably, pathways are provided within the equipment for optical signals, so that the advantages of transmission of optical signals are maximized.

As disclosed in Journal of Lightwave Technology, volume 6, pages 1034 to 1044, (1988), it has been proposed to form an optical waveguide in a layer of polymeric material as an integrated optical circuit, analogous to an integrated electrical circuit. Sources and receivers for the optical signals which are transmitted in the waveguide are mounted on the layer of polymeric material. Such optical circuits consist of a polyimide sheet in which a trench has been formed; the trench is lined with a layer of a cladding material and filled with a waveguide material. The filled trench is then covered with a layer of the cladding material. Signals can be transmitted between the optical circuit and other pieces of equipment by means of optical fibers which are terminated in such a way that the signals are transmitted directly between the waveguide and the optical fiber.

The sheet in which the waveguide is provided may also have pathways for electrical signals associated with it, generally in the form of traces of electrically conductive material, for example using printed circuit board technology. Thus a single sheet may include pathways for both optical and electrical signals.

Sources and receivers for optical signals transmitted in a waveguide associated with a sheet are generally fixed to the surface of the sheet, for example, by means of an adhesive. It is important to ensure that such devices are positioned accurately on the surface of the sheet in order to minimize loss of signal transmitted between the waveguide and the device. When the devices are attached to the sheet in such a way that they are fixed to it, accurate positioning is made difficult by the fact that the devices cannot be moved relative to the sheet once they have been so attached.

The present invention provides a technique for attaching an optically active device to a substrate which includes a waveguide, in such a way that it can be moved relative to the substrate after it has been so attached, in order to ensure that the device is positioned accurately relative to the waveguide in the substrate.

In one aspect, the invention provides a circuit for the transmission of optical signals, comprising:
(a) a substrate;
(b) a waveguide through which an optical signal can pass when the circuit is in use;
(c) an optical component which includes an optically active device which is optically connected to the waveguide, the waveguide and the device being separated by a fluid which is transparent to the optical signal; and
(d) means by which the substrate and the component are mechanically interconnected, the interconnection means allowing the substrate and the device to move relative to one another, at least in the plane which extends perpendicular to the direction in which the signal passes between the waveguide and the device.

In another aspect, the invention provides a method of making a circuit for the transmission of optical signals, which comprises:
(a) providing a substrate, a waveguide through which an optical signal can pass when the circuit is in use, and an optical component which includes an optically active device for optical connection to the waveguide; and
(b) mechanically connecting the substrate and the optically active device to one another, so that the device is optically connected to the waveguide and separated from it by a fluid which is transparent to the signal, by interconnection means which allows the substrate and the device to move relative to one another, at least in the plane which extends perpendicular to the direction in which the signal passes between the waveguide and the device.

Preferably, the interconnection means are wires which extend between the substrate and the component. More preferably, each wire is bonded at least at one end to the substrate or the component without the use of a material other than the materials of the wire, and of the substrate or the component, as the case may be, to which the said end of the wire is bonded. The use of wires to interconnect components in this way is the subject of WO-A-88/0429 and WO-A-88/09599. Those documents disclose a configuration of interconnection in which components are mounted in a face-to-face arrangement, with interconnection wires extending between respective contacts on the facing surfaces of the components. In the context of the present invention, it is preferred that the faces of the substrate and the component through which the signal passes face towards one another.

The use of wires of an electrically conductive material as the interconnection means has the highly significant advantage that they may serve the purpose of supplying electrical power to the optical component, in addition to forming a flexible mechanical connection to the component which can facilitate alignment of the component with a waveguide. This feature can be useful, for example, when the component includes a light source such as a laser, which requires power in order to generate light signals.

Preferably, the wires which extend between the substrate and the component are bonded at least at one end to the substrate or the component without the use of a material other than the materials of the wire, and of the substrate or the component, as the case may be, to which that end of the wire is bonded. For example, the wires may be bonded by the application of one or a combination of heat, pressure and vibration, for example by thermocompression bonding which utilizes a combination of heat and pressure, or by thermosonic or ultrasonic bonding which utilize a combination of heat, pressure and vibration.

The wires may be connected at their other ends by means of a material which is different from the materials of the wire, and of the substrate or the component, as the case may be, to which that end of the wire is bonded. The nature of the connection material will be selected according to the functional requirements placed on the wires when in use. For example, when the wires supply electrical power to the optical component, in addition to forming a mechanical connection to the component, the connection material will generally be electrically conductive. The mechanical and thermal conditions to which the circuit will be exposed, and the materials of the wires and of the substrate or the component should be considered. For example, it will generally be preferable not to use a lead-based solder to form a connection to a gold wire because of undesirable reactions between the solder and the wire. Examples of suitable connection materials include adhesives such as epoxy resins, which may be electrically conductive, and solders. Preferred solders include those based on 50% Pb/50% In, 95% Pb/5% In, 80% Au/20% Sn and 95% Pb/5% Sn.

The wires may be connected at their other ends without the use of another material, such as by being received with a friction fit in an aperture, for example with the wires being compressed longitudinally and thereby assuming a larger transverse dimension.

Preferably, the wires are connected at one end to one of the substrate and the component, especially the component, without the use of a material other than the materials of the wire, and of the substrate or the component, as the case may be, to which that end of the wire is bonded. The wires will be arranged such that they extend in a direction away from the surface of the substrate or the component, as the case may be. The other of the substrate and the component will then be positioned so that the substrate and the component are in face-to-face relationship, and the wires are connected at their other ends to the other of the substrate and the component by means of another material, in particular, a solder.

The use of flexible interconnection means such as wires to mount the optical component on the substrate has the advantage that, even if the component is subsequently fixed to the substrate, for example by means of an adhesive, the optically active device and the substrate can be moved relative to one another in a controlled manner, and can then be retained in their desired relative positions, whether or not the device is to be so fixed. While the device is movable relative to the substrate, it will be separated from it by a fluid which is transparent to the optical signal which is transmitted between the device and the waveguide. The fluid may be a gas, for example air, particularly when a material is subsequently provided between the device and the substrate, for example to attach the device to the substrate; alternatively, the fluid may be a liquid, for example, it may be an adhesive provided in liquid form which subsequently cures in situ to attach the component to the substrate.

The number of wires which are used to connect a particular component to a substrate will be selected according to a number of factors, including the size and weight of the component, the mechanical and thermal treatment to which the equipment in which the circuit is incorporated is to be subjected when in use, the nature of any material located between the device and the substrate, the physical characteristics of the wires themselves, and the nature of any electrical function which the wires are required to perform. From a mechanical viewpoint, it will generally be preferred that the substrate and the component are connected to one another at least at three points in order that the component is supported in a stable fashion.

The lengths of the interconnection wires may decrease from one edge region of the component to another edge region so that the optically active device is mounted on the substrate inclined to the surface thereof. This can allow transmission of signals between the device and the substrate other than in a direction perpendicular to the surface of the substrate.

The material of the wires will be selected according to the physical requirements placed on it, both during manufacture and use of the circuit, and the nature of any electrical function which the wires are required to perform. When the wires are bonded at one end to either the substrate or the component without the use of a material other than the materials of the substrate and the component, for example by thermocompression bonding, the material of the wires will be required to capable of forming bonds in this way. Wires which are commonly bonded in this way include gold wires, especially hard drawn gold wires, although wires formed from other metals such as copper or aluminum may be used.

Wires which are bonded by the application of one or a combination of heat, pressure and vibration, for example by thermocompression, thermosonic or ultrasonic bonding, may be supplied to the object to which they are to be bonded by means of conventional wire bonding equipment. Preferred wire bonding equipment is disclosed in WO-A-88/0429 and WO-A-88/09599 and in the patent application filed contemporaneously with the present application entitled "Weakening wire supplied through a wire bonder", naming Alexander S. Gliga as an inventor (docket number MP1325 US).

The waveguide with which the component is optically connected may form part of the substrate. For example, the waveguide may be an internal waveguide in the sense that it is embedded in the substrate, for example as a result of being formed by filling a trench in the substrate, or it may be external in the sense that it is provided by an optical fiber which is provided on a surface of the substrate.

Alternatively, the waveguide may form part of another component which is mounted on the substrate, for example alongside the component which is connected to the substrate by the flexible interconnection means. Preferably, the interconnection means which is used in this arrangement permits relative movement between the component and the substrate both parallel and perpendicular to the surface of the substrate on which one or both of the components are mounted. Wires used as the interconnection means can permit such relative movement. Both of the components between which the signal passes may be connected to the substrate be the flexible interconnection means.

The optically active device may serve as a source or as a receiver for the signal which is transmitted between it and the substrate. For example, when the device serves as a transmitter, it may include a light source such as a laser. The device may, but need not necessarily, modify the signal.

The optical component may include elements which are optically inactive; for example, the component may include a carrier on which the optically active device is mounted. This can facilitate mounting of such the optically active device on a substrate, for example to facilitate mounting of a particularly small or fragile device on a substrate, or to allow a device to be mounted with the surface through which the signal passes between the substrate and the device being different from the surface which is used for mounting the device. For example, when a signal passes through an edge of a relatively flat device, and it is therefore desirable to mount the edge of the device facing the waveguide in the substrate, the device can be mounted on a carrier using a large flat surface of the device, and the carrier mounted on the substrate in such a way that the device is oriented as desired.

The optically inactive element may include electrically conductive traces through which power may be supplied to an optical component which is associated with the element.

The use of a carrier has the advantage that the optical device can be mounted on it in such a way that permits efficient heat transfer, which can be important when the optical device generates a large amount of heat. For example, the device and the carrier may be arranged in face-to-face contact, and held together by a thin layer of a thermally conductive adhesive material. Electrical connections between an optically active device mounted in this way and a carrier may be made be means of interconnection wires which extend between the carrier and a face of the device other than the face which is in contact with the carrier. Furthermore, the use of a carrier can facilitate manipulation and movement of the device, which can be particularly important when the device is small. It also allows interconnection means to be used which are larger, and therefore stronger than interconnection means which could be used on the device alone, facilitating application of means for controlling heat which is generated by the optical component.

The connections between the optically active device and the carrier, and between the carrier and the substrate, will be such that the substrate and the device can be moved relative to one another at least in the plane which extends perpendicular to the direction in which the signal passes between the waveguide and the device. This may involve attaching the device to the carrier, for example by means of an adhesive, and connecting the carrier to the substrate by means of wires, for example as discussed above, such that the carrier and the substrate can move relative to one another, at least in the plane which extends perpendicular to the direction in which the signal passes between the waveguide and the optically active device. Alternatively or in addition, the connection between the optically active device and the carrier may be such that the device and the carrier can move relative to one another, at least in the plane which extends perpendicular to the direction in which the signal passes between the waveguide and the device. This has the advantage that the carrier can be fastened to the substrate rigidly, which minimises unwanted relative movement between the substrate and the device, and therefore facilitates use of heat controlling means in conjunction with the carrier.

Preferably, the carrier and the substrate contact and another at least at three points, for the support of the device to be stable.

The material of the carrier will preferably be able to withstand high temperature, such as might be encountered during manufacture of components of the circuit, or during use of the device of the device generates a large amount of heat. Examples of suitable materials include certain ceramic materials.

The method of the invention preferably includes the step of moving the optically active device and the substrate relative to one another in the plane which extends perpendicular to the direction in which the signal passes between the waveguide and the device, so as to maximize the signal which is passed between the waveguide and the device. Such movement may be provided by flexing of the interconnection means. Preferably, the substrate is held fixed, and the device is moved relative to the substrate, for example by means of a actuator having an arm which is able to move in two directions in the plane which extends perpendicular to the direction in which the signal passes between the waveguide and the device. The end of the arm may be temporarily connected to the component, for example, by a suction pad, or by means of an adhesive.

The relative movement may be controlled by a monitor which detects the amount of light which passes between the waveguide and the component. For example, light may be supplied by the component itself when it is intended to function as a light source when in use, or light may be supplied to the component, for example from the arm of the actuator which is used to impart relative movement to the component and the substrate. The light which passes from the component into the waveguide in the substrate may be monitored by means of an appropriate receiver, and appropriate adjustments may then be made to the relative positions of the component and the substrate to maximize the signal that is passed between them. The reverse arrangement could be used, in which light which is supplied to the waveguide and which passes into the component is monitored.

It will be understood that the relative movement between the substrate and the device that the interconnection means is able to accommodate is in the plane which extends perpendicular to the direction in which the signal passes between the waveguide and the device. However, movement in the plane may be in only one direction. Furthermore, some movement may also take place in the direction parallel to the direction in which the signal passes between the waveguide and the device.

Embodiments of the present will now be described by way of example with reference to the accompanying drawings, in which:

FIGS. 1 and 2 are side elevations of optical components which have interconnection wires bonded to them;

FIG. 3 is an isometric view of a substrate having optical waveguides associated with it;

FIG. 4 is a side elevation of the components shown in FIGS. 1 and 2 mounted on the substrate shown in FIG. 3;

FIGS. 5 and 6 are side elevations of optical components which have interconnection wires bonded to them;

FIG. 7 is a side elevation of the components shown in FIGS. 5 and 6 mounted on a substrate; and FIG. 8 is a side elevation of a substrate having two optical components mounted on it.

Referring to the drawings, FIG. 1 shows an optical component 1 which may be a light source such as a laser, or a receiver.

Four interconnection wires 3 (of which two are visible) are bonded to the component. The wires have been formed by bonding hard drawn gold wire to the component by thermocompression bonding, severing the bonded wires to a desired length, and applying force to each severed wire in a direction away from the bond to the component, for example as described in WO-A-88/0429 and WO-A-88/09599.

FIG. 2 shows an optical component 11 which comprises an optically active device 13 such as a laser, and an optically inactive carrier 15. The carrier 15 has a first arm 17 on which the device 13 is mounted, and a second arm 19 through which the component is mounted on a substrate. The first and second arms are approximately perpendicular to one another. The device 13 is relatively flat, and the signal which is transmitted between it and the substrate on which it is mounted when in use passes through an edge 21. The device 13 is mounted on the carrier 15 through one of its large flat surfaces by means of an adhesive.

The carrier allows the device to be mounted on a substrate in such a way that the edge 21 through which the signal passes faces the substrate.

Interconnection wires 23 are bonded to the carrier 15 in the same way as they are bonded to the component 1 shown in FIG. 1.

FIG. 3 shows a substrate 25 which comprises a sheet of an insulating material, preferably a polyimide. Waveguides are provided within the sheet of insulating material. They may be so provided by forming a trench in the sheet, for example by appropriate use of masks and of etching techniques, lining the trench with a cladding material, and filling the lined trench with a waveguide material. The filled trench may then be covered with a layer of the cladding material. More information on waveguides of this type is available from Journal of Lightwave Technology, volume 6, pages 1034 to 1044, (1988). One such waveguide 27 is shown in FIG. 3, terminating at one end at an edge 29 of the substrate 25, and at its other end on a principal surface 31 of the substrate.

The substrate 25 also includes an external waveguide 33 which is provided by an optical fiber which is attached to the principal surface 31 of the substrate, for example mechanically or by means of an adhesive.

FIG. 4 shows the substrate 25 with the components 1, 11 bonded to it on its principal surface 31. The components have been bonded to that surface by means of quantities of a Pb/In solder located in respective recesses in the surface of the substrate, into which the ends of the wires have been inserted before the adhesive is allowed to cure. The recesses are located in the vicinity of the ends of the waveguides 27, 33, so that signals can be passed between the ends of the waveguides and the components. Component 11 is shown with the end of an arm 35 of an actuator 37 attached to it by means of suction. The actuator allows the end of the arm to be moved in the plane which extends perpendicular to the direction in which the signal passes between the substrate 25 and the component 11. A receiver is connected to the waveguide 33 to monitor the light that is passed from the component 11 into the waveguide 33, and appropriate adjustments are made to the position of the component, relative to the waveguide, to maximize the transmitted signal.

FIG. 5 shows an optical component 40 which comprises a laser 41 which is attached in face-to-face contact to a surface 42 of an optically inactive carrier 43 by means of a layer of a thermally conductive adhesive. Electrical connections are made between the laser and the carrier by means of interconnection wires 45 which extend between the surface 42 of the carrier on which the laser is mounted, and the surface 46 of the laser which faces away from the carrier. The wires may be bonded to the laser by thermocompression ball bonding, and to the carrier by thermocompression wedge bonding.

Wires 47 are bonded to the surface 42 of the carrier 43 by thermocompression ball bonding and arranged to extend in a direction away from the surface. The wires serve both to support the carrier and the laser, and to provide electrical power, supplied through the substrate, to the laser. These wires 47 are thicker and therefore stronger than the wires 45 which extend between the laser and the carrier.

FIG. 6 shows an optical component 50 comprising a laser 51 which is attached in face-to-face contact to a surface 53 of an optically inactive carrier 55 by means of a layer of a thermally conductive adhesive.

Wires 57 are bonded to the surface 58 of the laser 51 by thermocompression ball bonding and arranged to extend in a direction away from the surface. The wires serve to provide electrical power, supplied through a substrate, to the laser. The provision of power to the laser directly through wires which extend between it and the substrate has the advantage that the path along which signals are transmitted between the substrate and the laser is relatively short, compared with the arrangement depicted in FIG. 5.

Leg portions 59 are provided on the surface 53 of the carrier 55. The leg portions serve to support the carrier and the laser. Instead of the leg portions 59, interconnection wires may be used to connect the carrier to the substrate. Such wires may be thicker and therefore stronger than the wires 57 which are provided on the surface 58 of the laser 51, and can therefore provide support for the laser.

FIG. 7 shows a substrate 61 having optical waveguides 63 embedded in it. The optical components 40, 50 shown in FIGS. 5 and 6 are mounted on the substrate and electrically connected to it by means of the wires which are bonded to the lasers or to the carrier. The wires 47 which are bonded to the surface of the carrier 43 of the first component 40, and the wires 57 which are bonded to the surface of the laser 51 of the second component 50, are bonded to the substrate by means of solder. The leg portions 59 of the carrier 55 of the second component 50 are bonded to the substrate by means of an adhesive.

FIG. 8 shows a substrate 71 with has a waveguide 72 embedded in it, and two optical components 73, 75 mounted on it. One of the components 73 is fixed rigidly to the substrate by means of an adhesive, and contains a receiver and a waveguide 77, which is optically connected to the waveguide 72 in the substrate. The other component 75 includes a laser 79, and is depicted in more detail in FIG. 5 above.

Alignment of the receiver in the first component 73 with the laser in the second component 75 is made possible by movement of the second component perpendicular to the surface of the substrate concomitant with movement perpendicular to that surface.

What is claimed is:

1. A circuit for the transmission of optical signals, comprising:
   (a) a substrate;
   (b) a waveguide through which an optical signal can pass when the circuit is in use;
   (c) an optical component which includes an optically active device which is optically connected to the waveguide; and
   (d) means by which the substrate and the component are mechanically interconnected, the interconnection means allowing the substrate and the device to move relative to one another after the substrate and device are mechanically interconnected, at least in the plane which extends perpendicular to the direction in which the signal passes between the waveguide and the device so as to allow accurate positioning of the device relative to the waveguide.

2. A circuit as claimed in claim 1, in which the interconnection means includes at least one wire which extends between the substrate and the component.

3. A circuit as claimed in claim 2, in which each wire is bonded at least at one end to the substrate or the component without the use of a material other than the materials of the wire, and of the substrate or the component, as the case may be, to which the said end of the wire is bonded.

4. A circuit as claimed in claim 2, in which each wire is bonded at least at one end to the substrate or the component by means of a material which is different from the materials of the wire, and of the substrate or the component, as the case may be, to which the said end of the wire is bonded.

5. A circuit as claimed in claim 2, in which at least three wires extend between the component and the substrate.

6. A circuit as claimed in claim 1, in which the waveguide is part of the substrate.

7. A circuit as claimed in claim 6, in which the waveguide is embedded, at least partially, in the substrate.

8. A circuit as claimed in claim 6, in which the waveguide is provided on a surface of the substrate.

9. A circuit as claimed in claim 6, in which faces of the substrate and the device through which the signals are to pass when the circuit is in use face towards one another.

10. A circuit as claimed in claim 1, in which the optical component includes an optically inactive carrier device on which the optically active device is mounted.

11. A circuit as claimed in claim 10, in which the interconnection between the carrier device and the substrate is such that the carrier device and the substrate can move relative to one another, at least in the plane which extends perpendicular to the direction in which the signal passes between the waveguide and the optically active device.

12. A circuit as claimed in claim 10, in which the interconnection between the component and the substrate includes a connection between the optically active device and the carrier device that allows the optically active device and the carrier device to move relative to one another, at least in the plane which extends perpendicular to the direction in which the signal passes between the waveguide and the device.

13. A circuit as claimed in claim 10, in which a surface of the optically active device which is mounted against the carrier device is different from a surface of the optically active device through which the signals are to pass when the circuit is in use.

14. A method of making a circuit for the transmission of optical signals, which comprises:
   (a) providing a substrate, a waveguide through which an optical signal can pass when the circuit is in use, and an optical component which includes an optically active device for optical connection to the waveguide; and
   (b) mechanically connecting the substrate and the optically active device to one another, so that the device is optically connected to the waveguide, by interconnection means which allows the substrate and the device to move relative to one another after being mechanically connected together, at least in the plane which extends perpendicular to the direction in which the signal passes between the waveguide and the device so as to allow accurate positioning of the device relative to the waveguide.

15. A method as claimed in claim 14, which includes the step of moving the component and the optically active device relative to one another in the plane which extends perpendicular to the direction in which the signal passes between the substrate and the device, so as to maximize the signal which is passed between the substrate and the device.

16. A method as claimed in claim 15, in which the relative movement is controlled by a monitor which detects the amount of light which passes between the substrate and the device.

17. A method as claimed in claim 14, in which the interconnection means includes at least one wire which extends between the substrate and the component.

18. A method as claimed in claim 17, which includes the step of bonding each wire at one end to the substrate or the component without the use of a material other than the materials of the wire, and of the substrate or the component, as the case may be, to which the said end of the wire is bonded.

19. A method as claimed in claim 17, which includes the step of bonding each wire at one end to the substrate or the component by means of a conductive material which is different from the materials of the wire, and of the substrate or the component, as the case may be, to which the said end of the wire is bonded.

20. A method as claimed in claim 14, in which the optical component includes an optically inactive carrier on which the optically active device is mounted.

21. A circuit for the transmission of optical signals, comprising:
   (a) a substrate;
   (b) a waveguide through which an optical signal can pass when the circuit is in use;
   (c) an optical component which includes an optically active device which is optically connected to the waveguide, the waveguide and the device being separated by a fluid which is transparent to the optical signal; and (d) means by which the substrate and the component are mechanically interconnected, the interconnection means allowing the substrate and the device to move relative to one another, at least in the plane which extends perpendicular to the direction in which the signal passes between the waveguide and the device, the interconnection means including at least one wire which extends between the substrate and the component.

* * * * *